United States Patent
Sodagar

(10) Patent No.: US 12,284,232 B2
(45) Date of Patent: Apr. 22, 2025

(54) SPLITTER AND MERGER FUNCTIONS FOR MULTIDIMENSIONAL SEGMENTED MEDIA DATA

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/073,048

(22) Filed: Dec. 1, 2022

(65) Prior Publication Data

US 2023/0224347 A1 Jul. 13, 2023

Related U.S. Application Data

(60) Provisional application No. 63/298,536, filed on Jan. 11, 2022.

(51) Int. Cl.
*H04L 65/60* (2022.01)
*H04L 47/34* (2022.01)

(52) U.S. Cl.
CPC .............. *H04L 65/60* (2013.01); *H04L 47/34* (2013.01)

(58) Field of Classification Search
CPC ........ H04L 47/34; H04L 65/70; H04L 65/762
See application file for complete search history.

(56) References Cited

U.S. PATENT DOCUMENTS

| | | | |
|---|---|---|---|
| 2015/0304667 A1* | 10/2015 | Suehring | H04N 19/46 375/240.02 |
| 2016/0134881 A1* | 5/2016 | Wang | G06F 9/45558 375/240.02 |
| 2018/0310010 A1 | 10/2018 | Hourunranta et al. | |
| 2020/0177694 A1* | 6/2020 | Kolan | H04L 65/65 |
| 2021/0021849 A1 | 1/2021 | Wang et al. | |
| 2021/0390318 A1* | 12/2021 | You | G06V 20/49 |

FOREIGN PATENT DOCUMENTS

| CN | 112150603 A | 12/2020 |
|---|---|---|
| WO | 2021/061785 A1 | 4/2021 |

OTHER PUBLICATIONS

Systems Subgroup, "Text of ISO/IEC FDIS 23090-8 2nd edition Network-based media processing", ISO/IEC JTC 1/SC 29/WG 03 N0299, Aug. 16, 2020, pp. 1-178 (Year: 2020).*

(Continued)

Primary Examiner — Caroline H Jahnige
(74) Attorney, Agent, or Firm — Sughrue Mion, PLLC

(57) ABSTRACT

A method including segmenting a multidimensional media stream into a plurality of segments of multidimensional media in a multidimensional space; splitting the segmented multidimensional media stream into a plurality of sub-streams that are capable of being processed in parallel, wherein each of the plurality of sub-streams comprises a segment metadata that is used for ordering the segments within the each sub-stream; processing each of the plurality of sub-streams in parallel; and merging the plurality of sub-streams into a single stream using the segment metadata carried to an output segment, wherein the single stream comprises ordered segments.

12 Claims, 5 Drawing Sheets

(56) References Cited

OTHER PUBLICATIONS

"Potential Improvements of ISO/IEC 23090-8 AMD 2 MPE capabilities, split-rendering support and other extensions", WG 03, MPEG Systems, ISO/IEC JTC 1/SC 29/WG 03 N 0394, nov. 9, 2021, pp. 1-73 (Year: 2021).*

"Revised text of ISO/IEC FDIS 23090-8 2nd edition Network-based Media Processing", ISO/IEC ITC 1/SC 29/WG 03 N0489 MPEG systems, Feb. 5, 2022, pp. 173-175. (Year: 2022).*

Iraj Sodagar, "Potential Improvements of ISO/IEC 23090-8 AMD 2 MPE capabilities, split-rendering support and other extensions", WG 03, MPEG Systems, ISO/IEC JTC 1/SC 29/WG 03 N 0394, Nov. 9, 2021, pp. 1-73.

Systems Subgroup, "Text of ISO/IEC FDIS 23090-8 2nd edition Network-based media processing", ISO/IEC JTC 1/SC 29/WG 03 N0299, Aug. 16, 2020, pp. 1-178.

International Search Report dated Apr. 17, 2023 from the International Searching Authority in International Application No. PCT/US2022/052642.

Written Opinion dated Apr. 17, 2023 from the International Searching Authority in International Application No. PCT/US2022/052642.

Japanese Office Action dated Nov. 19, 2024 in Application No. 2023-560809.

Sodagar, "Corrections for the scaling descriptors—ISO/IEC 23090 DAM2 Coded representation of immersive media—Part 8: Network-based media processing—Amendment 2: MPE capabilities, split-rendering support and other enhancements", ISO/IEC JTC 1/SC 29/WVG 03, N0334, Jul. 23, 2021 (60 pages total).

"Information technology—Coded representation of immersive media—Part 8: Network based media processing", International Standard, ISO/IEC 23090-8, First edition, Iso/Iec 23090-8:2020(E), Dec. 2020 (134 pages total).

Extended European Search Report issued Jan. 31, 2025 in Application No. 22920946.5.

\* cited by examiner

SPLITTER AND MERGER FUNCTIONS FOR MULTIDIMENSIONAL SEGMENTED MEDIA DATA

CROSS-REFERENCE TO RELATED APPLICATION

This application is based on and claims priority to U.S. Patent Application No. 63/298,536, filed on Jan. 11, 2022, the disclosure of which is incorporated herein by reference in its entirety.

TECHNICAL FIELD

The present disclosure provides an extension to the one-dimensional NBMP splitter and merger functions to support splitting and merging multidimensional media data into segments that each may be processed independently.

BACKGROUND

The network-based media processing (NBMP) framework defines the interfaces including both data formats and application programming interfaces (APIs) among entities connected through digital networks for media processing. The NBMP standard defines a set of tools for the independent processing of 1-dimensional media segments. The framework enables dynamic creation of media processing pipelines, as well as access to processed media data and metadata in real-time or in a deferred manner. The network and cloud platform are used to run various applications. When the media is multidimensional, there may be a need to segment the media data in multiple dimensions. If parallel processing is required, such media data needs to be split, processed in parallel paths, and merged again. The current NBMP splitter and merger functions do not support multi-dimensional segment metadata.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. The summary's sole purpose is to present some concepts of one or more embodiments of the present disclosure in a simplified form as a prelude to the more detailed description that is presented later.

According to some embodiments, there is provided a method performed by at least one processor. The method includes segmenting a multidimensional media stream into a plurality of segments of multidimensional media in a multidimensional space. The method further includes splitting the segmented multidimensional media stream into a plurality of sub-streams that are capable of being processed in parallel, wherein each of the plurality of sub-streams comprises a segment metadata that is used for ordering the segments within the each sub-stream. The method further includes processing each of the plurality of sub-streams in parallel; and merging the plurality of sub-streams into a single stream using the segment metadata carried to an output segment, wherein the single stream comprises ordered segments.

According to some embodiments, an apparatus includes at least one memory configured to store program code and at least one processor configured to read the program code and operate as instructed by the program code. The program code includes segmenting code configured to cause the at least one processor to segment a multidimensional media stream into a plurality of segments of multidimensional media in a multidimensional space. The program code further includes splitting code configured to cause the at least one processor to split the segmented multidimensional media stream into a plurality of sub-streams that are capable of being processed in parallel, wherein each of the plurality of sub-streams comprises a segment metadata that is used for ordering the segments within the each sub-stream. The program code further includes processing code configured to cause the at least one processor to process each of the plurality of sub-streams in parallel. The program code further includes merging code configured to cause the at least one processor to merge the plurality of sub-streams into a single stream using the segment metadata carried to an output segment, wherein the single stream comprises ordered segments.

According to some embodiments, a non-transitory computer-readable storage medium, stores instructions that, when executed by at least one processor, cause the at least one processor to segment a multidimensional media stream into a plurality of segments of multidimensional media in a multidimensional space. The instructions further cause the at least one processor to split the segmented multidimensional media stream into a plurality of sub-streams that are capable of being processed in parallel, wherein each of the plurality of sub-streams comprises a segment metadata that is used for ordering the segments within the each sub-stream. The instructions further cause the at least one processor to process each of the plurality of sub-streams in parallel using segment metadata carried with each multidimensional media segment. The instructions further cause the at least one processor to merge the plurality of sub-streams into a single stream using the segment metadata carried to an output segment, wherein the single stream comprises ordered segments.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which.

DETAILED DESCRIPTION

Figure 1:
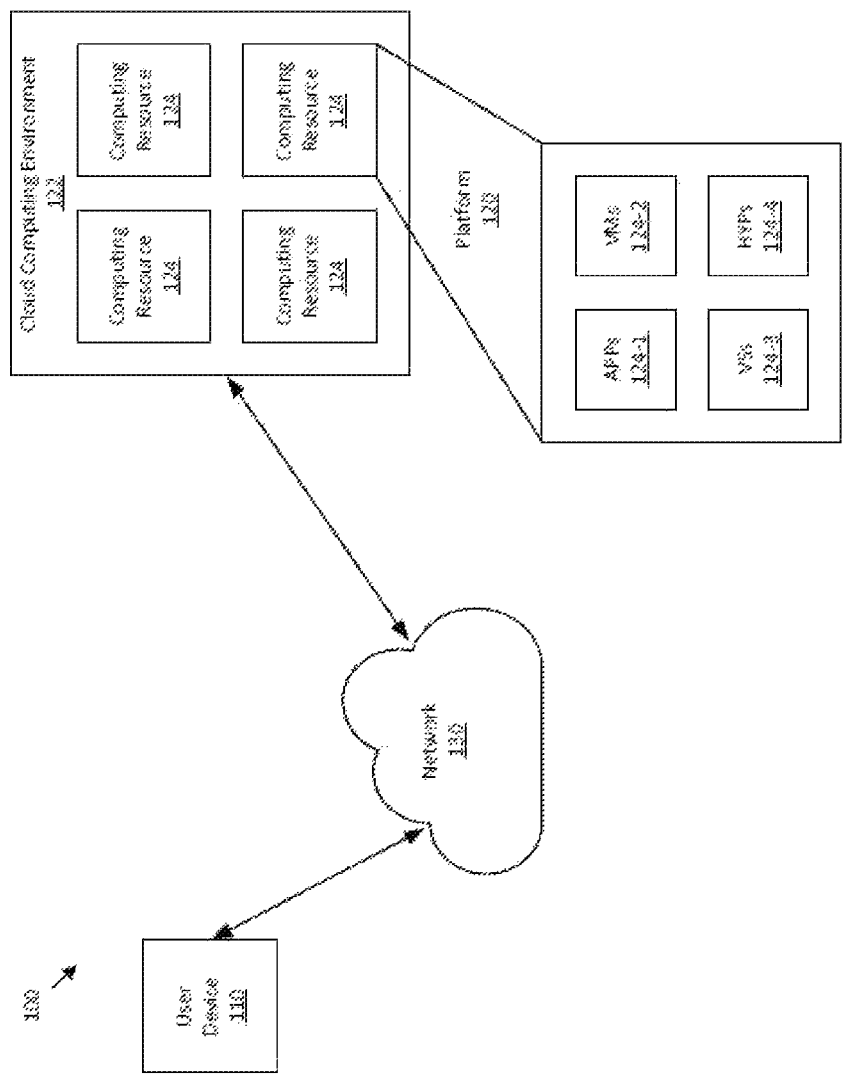
FIG. 1 is a diagram of an environment in which methods, apparatuses and systems described herein may be implemented, according to some embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

FIG. 1 is a diagram of an environment 100 in which methods, apparatuses and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
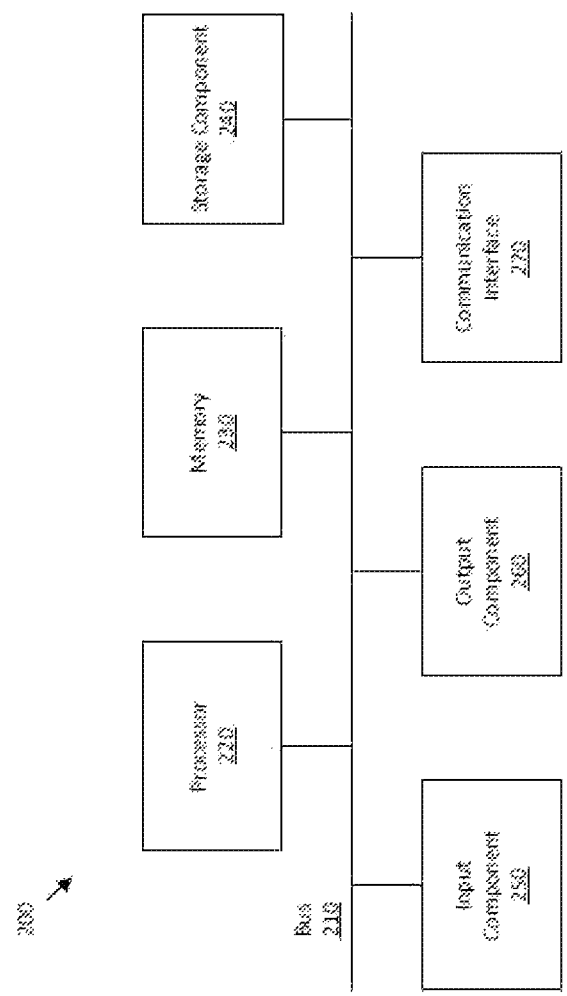
FIG. 2 is a block diagram of example components of one or more devices, according to some embodiments.

FIG. 2 is a block diagram of example components of one or more devices of FIG. 1. The device 200 may correspond to the user device 110 and/or the platform 120. As shown in FIG. 2, device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
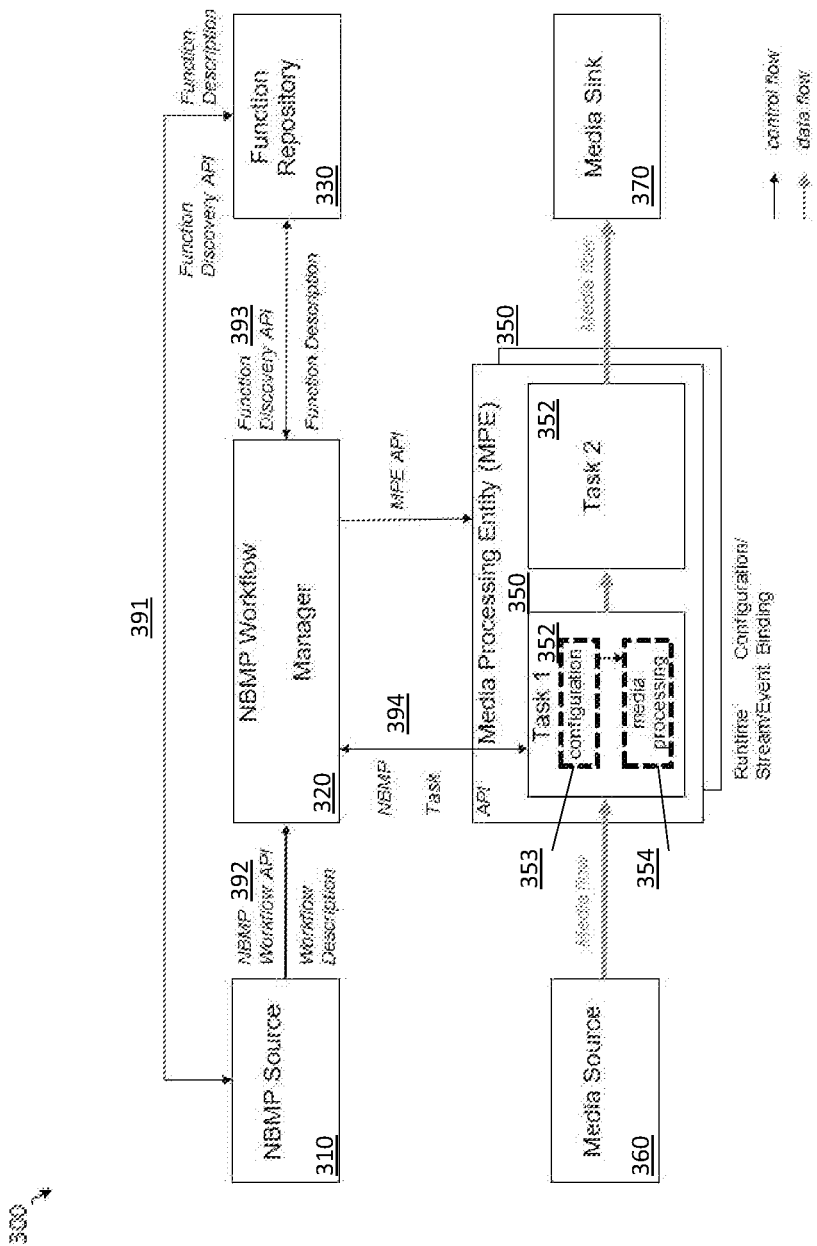
FIG. 3 is a block diagram of an NBMP system, according to some embodiments.

In some embodiments, an NBMP system 300 is provided. With reference to FIG. 3, the NBMP system 300 comprises an NBMP source 310, an NBMP workflow manager 320, a function repository 330, one or more media processing entities 350, a media source 360, and a media sink 370.

The NBMP source 310 may receive instructions from a third party entity, may communicate with the NBMP workflow manager 320 via an NBMP workflow, and may communicate with the function repository 330 via a function discovery API 391. For example, the NBMP source 310 may send a workflow description document(s) (WDD) to the NBMP workflow manager 320, and may read the function description of functions stored in the function repository 330. The functions may be media processing functions stored in memory of the function repository 330 such as, for example, functions of media decoding, feature point extraction, camera parameter extraction, projection method, seam information extraction, blending, post-processing, and encoding. The NBMP source 310 may comprise or be implemented by at least one processor and memory that stores code configured to cause the at least processor to perform the functions of the NBMP source 310.

The NBMP source 310 may request the NBMP workflow manager 320 to create workflow including tasks 352 to be performed by the one or more media processing entities 350 by sending the workflow description document, which may include several descriptors, each of which may have several parameters.

For example, the NBMP source 310 may select functions stored in the function repository 330 and send the workflow description document to the NBMP workflow manager 320 that includes a variety of descriptors for description details such as input and output data, required functions, and requirements for the workflow. The workflow description document may include a set of task descriptions and a connection map of inputs and outputs of tasks 352 to be performed by one or more of the media processing entities 350. When the NBMP workflow manager 320 receives such information from the NBMP source 310, the NBMP workflow manager 320 may create the workflow by instantiating the tasks based on function names and connecting the tasks in accordance with the connection map.

Alternatively, or additionally, the NBMP source 310 may request the NBMP workflow manager 320 to create workflow by using a set of keywords. For example, NBMP source 310 may send the NBMP workflow manager 320 the workflow description document that may include a set of keywords that the NBMP workflow manager 320 may use to find appropriate functions stored in the function repository 330. When the NBMP workflow manager 320 receives such information from the NBMP source 310, the NBMP workflow manager 320 may create the workflow by searching for appropriate functions using the keywords that may be specified in a Processing Descriptor of the workflow description document, and use the other descriptors in the workflow description document to provision tasks and connect them to create the workflow.

The NBMP workflow manager 320 may communicate with the function repository 330 via a function discovery API 393, which may be a same or different API from the function discovery API 391, and may communicate with one or more of the media processing entities 350 via an API 394 (e.g. an NBMP task API). The NBMP workflow manager 320 may comprise or be implemented by at least one processor and memory that stores code configured to cause the at least processor to perform the functions of the NBMP workflow manager 320.

The NBMP workflow manager 320 may use the API 394 to setup, configure, manage, and monitor one or more tasks 352 of a workflow that is performable by the one or more media processing entities 350. In some embodiments, the NBMP workflow manager 320 may use the API 394 to update and destroy the tasks 352. In order to configure, manage, and monitor tasks 352 of the workflow, the NBMP workflow manager 320 may send messages, such as requests, to one or more of the media processing entities 350, wherein each message may have several descriptors, each of which have several parameters. The tasks 352 may each include media processing functions 354 and configurations 353 for the media processing functions 354.

In some embodiments, after receiving a workflow description document from the NBMP source 310 that does not include a list of the tasks (e.g. includes a list of keywords instead of a list of tasks), the NBMP workflow manager 320 may select the tasks based on the descriptions of the tasks in the workflow description document to search the function repository 330, via the function discovery API 393, to find the appropriate functions to run as tasks 352 for a current workflow. For example, the NBMP workflow manager 320 may select the tasks based on keywords provided in the workflow description document. After the appropriate functions are identified by using the keywords or the set of task descriptions that is provided by the NBMP source 310, the NBMP workflow manager 320 may configure the selected tasks in the workflow by using the API 394. For example, the NBMP workflow manager 320 may extract configuration data from information received from the NBMP source, and configure the tasks 352 based on the configuration data.

The one or more media processing entities 350 may be configured to receive media content from the media source 360, process the media content in accordance with the workflow, that includes tasks 352, created by the NBMP workflow manager 320, and output the processed media content to the media sink 370. The one or more media processing entities 350 may each comprise or be implemented by at least one processor and memory that stores code configured to cause the at least processor to perform the functions of the media processing entities 350.

The media source 360 may include memory that stores media and may be integrated with or separate from the NBMP source 310. In some embodiments, the NBMP workflow manager 320 may notify the NBMP source 310 when a workflow is prepared and the media source 360 may transmit media content to the one or more of the media processing entities 350 based on the notification that the workflow is prepared.

The media sink 370 may comprise or be implemented by at least one processor and at least one display that is configured to display the media that is processed by the one or more media processing entities 350.

As discussed above, messages from the NBMP Source 310 (e.g. a workflow description document for requesting creation of a workflow) to the NBMP workflow manager 320, and messages (e.g. for causing the workflow to be performed) from the NBMP workflow manager 320 to the one or more media processing entities 350 may include several descriptors, each of which may have several parameters. In some examples, communication between any of the components of the NBMP system 300 using an API may include several descriptors, each of which may have several parameters.

Embodiments may relate to a method to identify and signal the nonessential inputs, outputs and tasks in a workflow run on the cloud platforms.

An essential output of a workflow may be an output of that workflow that must produce data for the workflow to be considered as operating properly. An essential input of the workflow may be an input that must be processed for the workflow to create the workflow's essential outputs. A properly operating workflow may be a workflow that processes all of the essential inputs and produces all of the essential outputs. An essential task of a workflow may be a task necessary to operate properly and process data that is required for a properly operating workflow. For example, an essential task may be a task that processes an essential input, and/or produces an essential output. In some embodiments, an essential input may be an input that is needed for an essential task to operate, and an essential output may be an output that is needed as an essential input for an essential task, or an output that is needed as an output for the workflow as a whole. A nonessential input may be an input that is not needed by the workflow in order to produce the essential outputs of the workflow. For example, a workflow may produce all of the essential outputs if all of the essential inputs are provided, even if none of the nonessential inputs are provided. A nonessential task may be a task that is included in the workflow, but that is not an essential task. For example, a nonessential task may process a nonessential input and produce a nonessential output.

Figure 4:
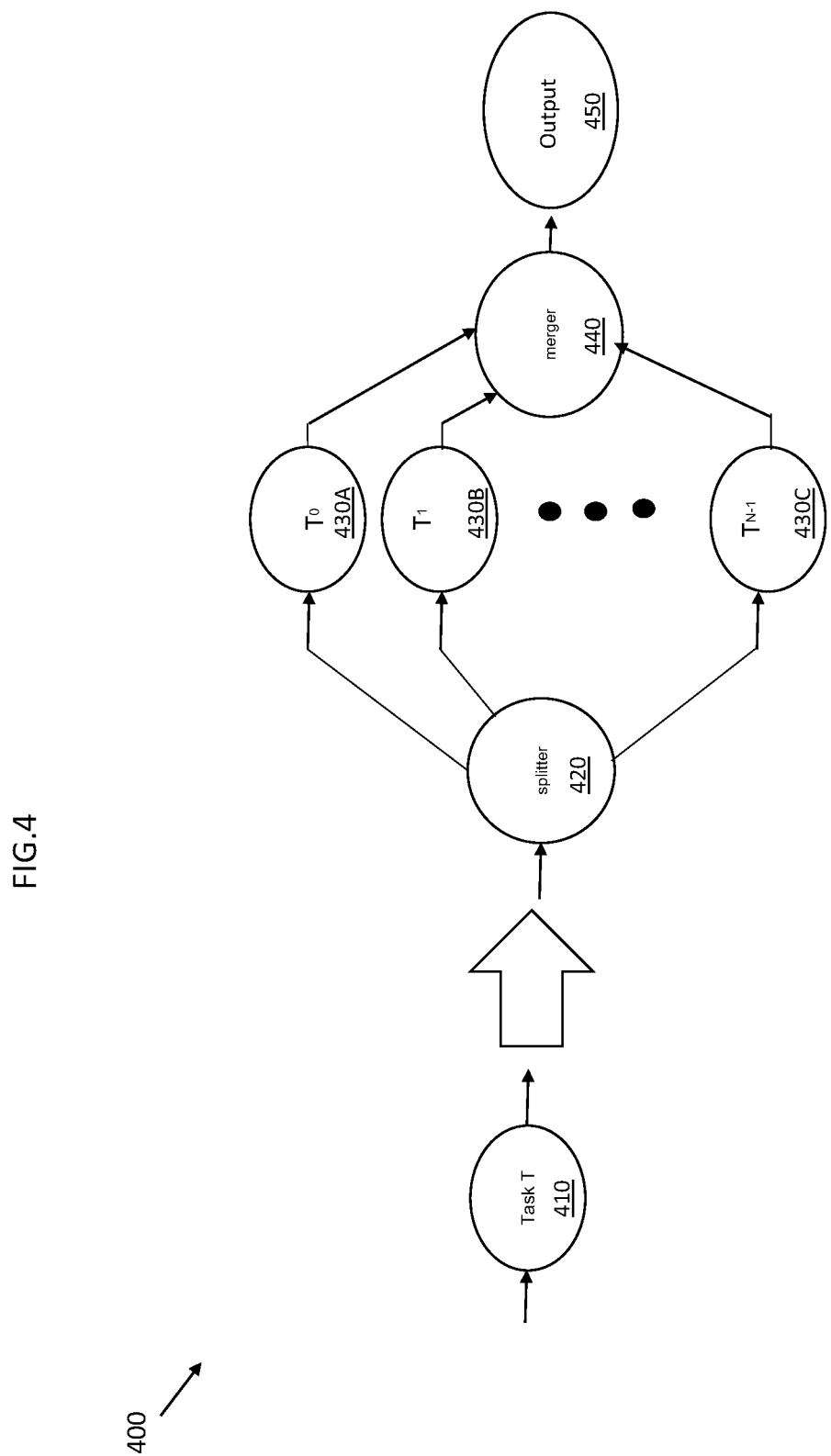
FIG. 4 is diagram of a workflow for parallel processing of segments, according to some embodiments.

The NBMP standard defines the splitter and merger function template. FIG. 4 shows a diagram of a workflow 400 corresponding to an example of this process of using NBMP splitter/merger functions for parallel processing of the segments. In FIG. 4, Task T 410 may be converted to n instances of Task T, running in parallel.

In some embodiments, the media stream is continuous. The splitter 420 may convert the media stream to N media sub-streams. Each sub-stream may be processed by an instance of T 430A-C and then the sub-streams are interleaved together at merger 440 to generate the output 450, equivalent of Task T 410 output stream. 1:N splitter and N:1 merger functions work on the segment boundaries. Each segment may have a start, duration, and length metadata, or a start code and a sequence number associated with it. Since the segments are independent, the sub-streams are independent of each other in terms of being processed by Task T 410. Task $T_0, \ldots, T_{N-1}$, do not need to process the segments at the same time. Since the segments and sub-streams may be independent, each instance of Task T 410 may run at its speed. However, the current NBMP standard only addresses the 1-D segmentation of the media data.

The current NBMP standard defines the following formats for the segment metadata. Each segment may satisfy the following requirements:
   A. a continuous set of samples
   B. the maximum duration of D in the scale of time-scale T, where D and T are configuration parameters Each segment may use one of the following metadata:
1. The timing metadata:
   A. Start time s in time-scale t,
   B. time-scale t=T,
   C. duration d in time scale t,
   D. length l (bytes)
2. Or, the sequence metadata:
   A. Identical and unique start code in all other segments
   B. A sequence number in increasing order.

In both cases, the media are segmented only in one dimension (e.g., typically time). However, media signals tend to be multidimensional.

The disclosure extends the splitter and merger functions to support splitting and merging segments with multidimensional metadata.

The following definitions may be used:
$\underline{C}$ is a vector $[c_0, c_1, \ldots, c_{M-1}]$ with M dimension, with element $c_i$ with index i, where index i+1 is nested in index i, meaning one increment of index i of the vector is considered a larger increase than any increment in indices i+1, i+2, ..., M−1, where $0 \le i < M$.

A multidimensional segment with dimension M may be defined as a segment representing the information regarding samples in space starting at point $\underline{S}=[s_0, s_1, \ldots, s_{M-1}]$ and length $\underline{D}=[d_0, d_1, \ldots, d_{M-1}]$, where $s_i$ and $d_i$ are non-negative integer numbers. If non-integer values are needed, then vector $\underline{T}=[t_0, t_1, \ldots, t_{M-1}]$ represents the scale factor $t_i$ for dimension i, in which the actual starting point and length in the dimension i are $s_i/t_i$ and $d_i/t_i$ respectively, where $t_i$ is a positive integer number.

In embodiments, all segments of a media stream may have one of the following metadata:
1. Segment location data:
   a. Scaling vector $\underline{T}=[t_0, t_1, \ldots, t_{M-1}]$, the scale factors for S and D
   b. Starting vector $\underline{S}=[s_0, s_1, \ldots, s_{M-1}]$ representing the starting point of the media segment in M dimensional space with each index $s_i$ in the unit $t_i$
   c. Length vector $\underline{D}=[d_0, d_1, \ldots, d_{M-1}]$ representing the hyperspace the media segment covering in M dimensional space with each index $d_i$ in the unit $t_i$
   d. The size of segment L in bytes.
2. Segment sequence data:
   a. Sequence vector $\underline{n}=[n_0, n_1, \ldots, n_{M-1}]$ representing the sequence of the media segment in M dimensional space with each index $n_i$
   b. Startcode C, a unique code that every segment starts with, and the code is not repeated in the middle of any segments.
   c. The size of segment L in bytes.

The Splitter Function may split the multidimensional input into multiple multidimensional outputs and shall have the following requirements:

One input and N output FIFO buffers, where N is a configuration parameter for the number of splits.

Input:
  Each input segment, each shall satisfy the following requirements:
    maximum size of $\underline{D}=[D_0, D_1, \ldots, D_{M-1}]$ in scale of scale $\underline{T}=[(T_0, T_1, \ldots, T_{M-1}]$, where $\underline{D}$ and $\underline{T}$ are set in the Function's configuration.
    Include one of the following metadata and constraint:
      The location metadata:
        start location $\underline{s}=[s_0, s_1, \ldots, s_{M-1}]$ in scale vector $\underline{t}=[t_0, t_1, \ldots, t_{M-1}]$, where the number $s_i$ is scaled in $t_i$.
        scale $\underline{t}=\underline{T}$
        length $\underline{d}=[d_0, d_1, \ldots, d_{M-1}]$ in scale $\underline{t}$
        byte size L (bytes)
      Or, the sequence metadata:
        Identical and unique start code in all other segments
        A sequence vector $\underline{n}=[n_0, n_1, \ldots, n_{M-1}]$ that increases with the order of segments
    Non-overlapping samples with other input segments
  The input segments shall be in increasing order.

Outputs:
  The media streams at every output buffer at any time consist of zero or more output segments. Each output segment shall satisfy the following requirements
  Identical exactly to one and only one input segment
  Include one of the following metadata and constraint:
    The location metadata:
      start location $\underline{s}=[s_0, s_1, \ldots, s_{M-1}]$ in scale vector $\underline{t}=[t_0, t_1, \ldots, t_{M-1}]$, where the number $s_i$ is scaled in $t_i$.
      scale $\underline{t}=\underline{T}$
      length $\underline{d}=[d_0, d_1, \ldots, d_{M-1}]$ in scale $\underline{t}$
      byte size L (bytes)
    Or, the sequence metadata:
      Identical and unique start code in all other segments
      A sequence vector $\underline{n}=[n_0, n_1, \ldots, n_{M-1}]$ that increases with the order of segments The collection of all output segments of all output buffer together shall cover the entire processed input segments (e.g., no sample of input is left out of the collection of output segments).

The split process occurs as the following: each of the N consecutive segments $g_0, g_1, \ldots, g_{N-1}$ in the input is moved to one of the output buffers $O_0, O_1, \ldots, O_{N-1}$ in this specific order (by moving the $i^{th}$ segment $g_i$ to the output $O_i$).

Each output buffer is reordered in increasing order of segments.

In the case of having a common header, the splitter shall repeat it in every single output. A media format may require the use of the same sequence of bytes at the start of the streams regardless of any parameter change in content represented by that stream. This sequence of the bytes which is fixed and not changing is referred to as the Common Header for that media format. The Common Header has a zero-length. In the splitter, adding the Common Header to every single output is required to maintain the compliancy of the output media streams to a specific media format that the input stream is compliant to. Since the Common Header does not describe any length of media, the segment containing the common header has zero length. Therefore, in the case of timing metadata, if the first segment of any stream has zero length, it is considered as the Common Header for that stream and the splitter can use this property to identify the Common Header segment. In the case of a Common Header not existing in the input (e.g., the first segment has nonzero length), the splitter doesn't need to add any Common Header to any of the outputs, and the first segment of input is treated like any other media segment in that input stream. In the case of sequence metadata, the segment with sequence number 0 is the Common Header segment, if the repeat-header flag is set in the configuration.

1. In the case of temporal segments, m=M=1 and d and t indicate duration and timescale respectively.
2. The function may support a maximum dimension of input signal i.e does not support splitting inputs with dimensions higher than a specific value. This value is defined as a contact configuration parameter.

The following tables describe the template supporting the multidimensional splitter function.

TABLE 1

Splitter Functions Description Template

| Descriptor | Parameter Name | Type | Description |
|---|---|---|---|
| General | nbmp-brand | String | "urn:mpeg:mpegi:nbmp:2020:split" |
| | input-ports | Object | input streams according to configuration |
| | output-ports | Object | output streams according to configuration |
| Processing | Keywords | Array | [<br>"1 to n split",<br>"stateless",<br>"parallelism"<br>] |
| Configuration | Parameters | Array | Function parameters:<br>• input-dimension<br>• number of splits<br>• scale<br>• variable-length<br>• segment-length<br>• segment-metadata<br>• input-buffer size<br>• output-buffer sizes<br>• repeat-header<br>• maximum segment size<br>• non-segment-operation<br>• percentage increment fullness event |

TABLE 1-continued

Splitter Functions Description Template

| Descriptor | Parameter Name | Type | Description |
|---|---|---|---|
| Variables | percent-full-buffer | Array of object | Parameter:<br>• buffer-fullness |
| Events | percent-full-buffer | Array of object | Parameter:<br>• buffer-fullness |
| Step | step-mode | string | Value: 'stateless' |
|  | segment-duration | number | Value of $D_0$ as defined in Description sub clause. |
|  | operation-units | number | Value of 1 |
|  | segment-metadata | Boolean | 'True' if segment timed metadata is supported. |
|  | segment-start code | Boolean | 'true' if sequence metadata including the start code and the sequence number |
|  | number-of-dimension | integer | Maximum number of dimensions other than one (M-1 in the function description). |

TABLE 2

Splitter Configuration Parameters

| Name | Definition | Unit | Type | Valid range |
|---|---|---|---|---|
| input-dimension | The input segment dimension. If the value is larger than 1, the following parameters are a vector of size dimension:<br>- scale<br>- segment-length<br>The default value is 1. | N/A | Number | unsigned integer (non-zero) |
| split-number | Number of splits | N/A | Number | unsigned integer (non-zero) |
| scale | The scale in units to be used for the derivation of length values of media segments.<br>If not present on any level, it shall be set to array of ones, i.e. [1 1 ... 1]. | N/A | Number | unsigned integer |
| variable-length | If 'True', the segment length may vary segment to segment.<br>If 'False', every segment has a length equal to segment-length. | N/A | N/A | Boolean |
| segment-length | The length of the operational segment in unit of scale.<br>If variable-length is 'True', this value indicates the maximum length of the segment. | N/A | Number | unsigned integer |
| segment-metadata | If 'true', the media data uses timing metadata for signaling the segment boundaries.<br>If 'false', the media data uses sequence metadata for signaling the segment boundaries.<br>The default value is 'true'. | N/A | N/A | Boolean |
| in-buffer-size | Size of the input FIFO buffer | byte | Number | unsigned integer |
| out-buffer-size | Size of each output FIFO buffer | byte | Number | unsigned integer |
| max-segment-size | Maximum size of operational segment | byte | Number | unsigned integer |
| repeat-header | If 'true', the common header of the input is repeated at each output. The default is 'false'. | N/A | Boolean | Boolean |
| non-segment-op | If 'true', this implementation supports non-segment operation. The default is 'false'. | N/A | Boolean | Boolean |
| buffer-fullness-inc-event | The percentage increase of buffer fullness by which an event is issued | N/A | Number | unsigned integer between 1 and 100 | unsigned integer = [0, (2*53)−1]

The Merger Function merges the multiple multidimensional inputs into a single multidimensional output and shall have the following requirements:
  N one input and one output FIFO buffers, where N is a configuration parameter for the number of merges.
  Inputs:
    Each input segment shall satisfy the following requirements:
      maximum size of $\underline{D}=[D_0, D_1, \ldots, D_{M-1}]$ in the unit of scale $\underline{T}=[(T_0, T_1, \ldots, T_{M-1}]$, where $\underline{D}$ and $\underline{T}$ are set in the Function's configuration.
      Include one of the following metadata and constraint:
        The location metadata:
          start location $\underline{s}=[s_0, s_1, \ldots, s_{M-1}]$ in scale vector $\underline{t}=[t_0, t_1, \ldots, t_{M-1}]$, where the number $s_i$ is scaled in $t_i$.
          scale $\underline{t}=\underline{T}$
          length $\underline{d}=[d_0, d_1, \ldots, d_{M-1}]$ in scale $\underline{t}$
          byte size L (bytes)
        Or, the sequence metadata:
          Identical and unique start code in all other segments
          A sequence vector $\underline{n}=[n_0, n_1, \ldots, n_{M-1}]$ that increases with the order of segments
        Non-overlapping samples with all other inputs' segments
    The input segments shall be in increasing order.
  Output:
    The media streams at the output buffer at any time consist of zero or more output segments. Every output segment shall satisfy the following requirements
      Identical exactly to one and only one input segment
      Include one of the following metadata and constraint:
        The location metadata:
          start location $\underline{s}=[s_0, s_1, \ldots, s_{M-1}]$ in scale vector $\underline{t}=[t_0, t_1, \ldots, t_{M-1}]$, where the number $s_i$ is scaled in $t_i$.
          scale $\underline{t}=\underline{T}$
          length $\underline{d}=[d_0, d_1, \ldots, d_{M-1}]$ in scale $\underline{t}$
          byte size L (bytes)
        Or, the sequence metadata:
          Identical and unique start code in all other segments
          A sequence vector $\underline{n}=[n_0, n_1, \ldots, n_{M-1}]$ that increases with the order of segments
    The collection of all output segments together shall cover the entire processed input segments of all inputs (e.g., no sample of input is left out of the collection of output segments).
    The merge process occurs as the following: one segment from every input $I_0, I_1, \ldots, I_{N-1}$ is moved to the output buffer in that order and then the output buffer is reordered in increasing order of segments.
    1.

In the case of having a common header, the splitter shall repeat it in every single output. A media format may require the use of the same sequence of bytes at the start of the streams regardless of any parameter change in content represented by that stream. This sequence of the bytes, which may be fixed and not changing, may be referred to as the Common Header for that media format. The Common Header may have a zero-length. In the splitter, adding the Common Header to every single output may be required to maintain the compliancy of the output media streams to a specific media format to which that the input stream is compliant. Since the Common Header does not describe any length of media, the segment containing the common header may zero length. Therefore, in the case of timing metadata, if the first segment of any stream has zero length, it may be considered as the Common Header for that stream and the splitter may use this property to identify the Common Header segment. In the case of a Common Header does not exist in the input (e.g. the first segment has nonzero length), the splitter doesn't need to add any Common Header to any of the outputs, and the first segment of input is treated like any other media segment in that input stream. In the case of sequence metadata, the segment with sequence number 0 is the Common Header segment, if the repeat-header flag is set in the configuration.

1. In the case of temporal segments, m=M=1 and d and t indicate duration and timescale respectively.
  2. The function may support a maximum dimension of input signal (e.g., does not support splitting inputs with dimensions higher than a specific value). This value may be defined as a contact configuration parameter.

The following tables describe the template supporting the multidimensional merger function.

TABLE 3

Merger Function Description Template

| Descriptor | Parameter Name | Type | Description |
|---|---|---|---|
| General | nbmp-brand | String | "urn:mpeg:mpegi:nbmp:2020:merge" |
|  | input-ports | Object | input streams according to configuration |
|  | output-ports | Object | output streams according to configuration |
| Processing | Keywords | Array | [<br>"n to 1 merge",<br>"stateless",<br>"parallelism"<br>] |
| Configuration | Parameters | Array | Function parameters:<br>• input-dimension<br>• number of merges<br>• scale<br>• variable-length<br>• segment-length<br>• segment-metadata<br>• input buffer sizes<br>• output buffer sizes<br>• maximum segment size<br>• repeat-header<br>• non-segment-operation<br>• percentage increment fullness event |

TABLE 3-continued

Merger Function Description Template

| Descriptor | Parameter Name | Type | Description |
|---|---|---|---|
| Variables | percent-full-buffer | Array of object | Parameter:<br>• buffer-fullness |
| Events | percent-full-buffer | Array of object | Parameter:<br>• buffer-fullness |
| Step | step-mode | string | Value: 'stateless' |
| | segment-duration | number | Value of D as defined in Description sub clause. |
| | operation-units | number | Value of 1 |
| | segment-metadata | Boolean | 'true' if segment timed metadata is supported. |
| | segment-start code | Boolean | 'true' if sequence metadata including the start code and the sequence number |
| | number-of-dimension | integer | Maximum number of dimensions other than one (M-1 in the function description). |

20

TABLE 4

Merger Configrueation Paramters

| Name | Definition | Unit | Type | Valid range |
|---|---|---|---|---|
| input-dimension | The input segment dimension.<br>If the value is larger than 1, the following parameters are a vector of size dimension:<br>- scale<br>- segment-length<br>The default value is 1. | N/A | number | unsigned integer (non-zero) |
| merge-number | Number of merges | N/A | number | unsigned integer (non-zero) |
| scale | The scale used for the derivation of length values of media segments.<br>If not present on any level, it shall be set to array of ones, i.e. [1 1 ... 1]. | N/A | number | unsigned integer |
| variable-length | If 'True', the segment length may vary segment to segment.<br>If 'False', every segment has a length equal to segment-length. | N/A | N/A | Boolean |
| segment-length | The length of the operational segment in units of scale.<br>If variable-length is 'True', this value indicates the maximum length of the segment. | N/A | number | unsigned integer |
| segment-metadata | If 'true', the media data uses timing metadata for signaling the segment boundaries.<br>If 'false', the media data uses sequence metadata for signaling the segment boundaries.<br>The default value is 'true'. | N/A | N/A | Boolean |
| in-buffer-size | Size of each input FIFO buffers. | Byte | number | unsigned integer |
| out-buffer-size | Size of the output FIFO buffer. | Byte | number | unsigned integer |
| max-segment-size | Maximum size of operational segment | Byte | number | unsigned integer |
| repeat-header | If 'true', the common header of the inputs is added to the output only once.<br>The default is 'false'. | N/A | Boolean | Boolean |
| non-segment-op | If 'true', this implementation supports non-segment operation<br>The default is 'false'. | N/A | Boolean | Boolean |
| buffer-fullness-inc-event | The percentage increase of buffer fullness by which an event is issued | N/A | number | unsigned integer between 1 and 100 | unsigned integer = [0, (2*53)−1]

Figure 5:
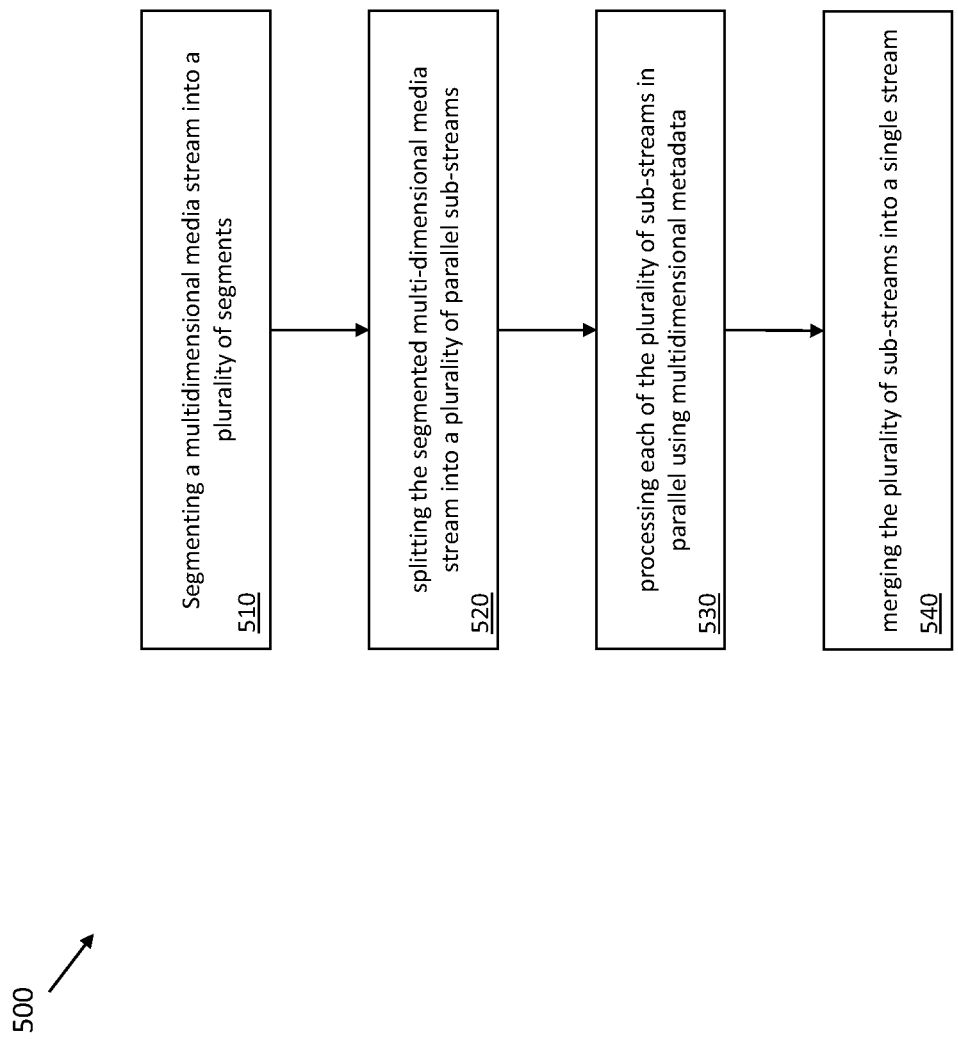
FIG. 5 is a flow chart for processing media content in NBMP, according to some embodiments.

FIG. 5 is a flowchart of example process 500 for splitting and merging a multidimensional media stream. In some implementations, one or more process blocks of FIG. 5 may be performed by any of the elements discussed above, for example NBMP system 300 or any element included therein, for example NBMP workflow manager 320.

As shown in FIG. 5, process 500 includes segmenting a multidimensional media stream into a plurality of segments of multidimensional media in a multidimensional space (operation 510).

As further shown in FIG. 5, the process 500 may include splitting the segmented multidimensional media stream into a plurality of parallel sub-streams (operation 520).

As further shown in FIG. 5, the process 500 may include processing each of the plurality of sub-streams in parallel using multidimensional metadata carried with each multidimensional media segment (operation 530).

As further shown in FIG. 5, the process 500 may include merging the plurality of sub-streams into a single stream using the multidimensional metadata carried to an output segment (operation 540).

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method performed by at least one processor, the method comprising:
   segmenting a multidimensional media stream, wherein the multidimensional media stream comprises multidimensional media in a multidimensional space;
   splitting the multidimensional media stream into a plurality of input media streams that are capable of being processed in parallel using a splitter function descriptor, the splitter function descriptor comprising parameters comprising:
   an input-dimension parameter that indicates dimensions of an input media segment, wherein when a number of dimensions of the multidimensional media stream is greater than one, the input-dimension parameter is a vector of a size dimension and vector components that include a scale and segment-length;
   a scale parameter indicating a scale in units to be used for derivation of length values;
   a segment metadata having a Boolean value that indicates whether segment timed metadata is supported;
   a segment startcode parameter having a Boolean value that indicates whether Sequence metadata comprises a startcode and a sequence number; and
   a number of dimension parameter having an integer value indicating a maximum number of dimensions of the multidimensional media stream; and
   processing the plurality of input media streams in parallel.

2. The method according to claim 1, wherein the parameters associated with splitting further comprise segment timing metadata indicating whether timing metadata is to be used for signaling segment boundaries.

3. The method according to claim 1, further comprising, ordering the plurality of input media streams in an increasing order of input media segments, wherein an order is indicated using the segment timing metadata.

4. The method according to claim 1, wherein the parameters associated with the splitting further comprising a variable-length parameter that indicates whether a length of the input media segment varies between one or more input media segments.

5. An apparatus comprising:
   at least one memory configured to store program code; and
   at least one processor configured to read the program code and operate as instructed by the program code, the program code comprising:
   segmenting code configured to cause the at least one processor to segment a multidimensional media stream, wherein the multidimensional media stream comprises multidimensional media in a multidimensional space;
   splitting code configured to cause the at least one processor to split the multidimensional media stream into a plurality of input media streams that are capable of being processed in parallel using a splitter function descriptor, the splitter function descriptor comprising parameters comprising:
   an input-dimension parameter that indicates dimensions of an input media segment, wherein when a number of dimensions of the multidimensional media stream is greater than one, the input-dimension parameter is a vector of a size dimension and vector components that include a scale and segment-length;
   a scale parameter indicating a scale in units to be used for derivation of length values;
   a segment metadata having a Boolean value that indicates whether segment timed metadata is supported;
   a segment startcode parameter having a Boolean value that indicates whether sequence metadata comprises a startcode and a sequence number; and
   a number of dimension parameter having an integer value indicating a maximum number of dimensions of the multidimensional media stream; and
   processing code configured to cause the at least one processor to process the plurality of input media streams in parallel.

6. The apparatus according to claim 5, wherein the splitting code is configured to cause the at least one processor to split the multidimensional media stream based on the parameters that further comprises a segment timing metadata indicating whether timing metadata is to be used for signaling segment boundaries.

7. The apparatus according to claim 5, wherein the computer program code further includes first ordering code configured to cause the at least one processor to order the plurality of input media streams in an increasing order of input media segments, wherein an order is indicated using the segment timing metadata.

8. The apparatus according to claim 5, wherein the parameters associated with the splitting code further comprise a variable-length parameter that indicates whether a length of the input media segment varies between one or more input media segment.

9. A non-transitory computer-readable storage medium, storing instructions, which, when executed by at least one processor, cause the at least one processor to:
  segment a multidimensional media stream, wherein the multidimensional media stream comprises multidimensional media in a multidimensional space;
  split the multidimensional media stream into a plurality of input media streams that are capable of being processed in parallel using a splitter function descriptor, the splitter function descriptor comprising parameters comprising:
    an input-dimension parameter that indicates dimensions of an input media segment, wherein when a number of dimensions of the multidimensional media stream is greater than one, the input-dimension parameter is a vector of a size dimension and vector components that include a scale and segment-length;
    a scale parameter indicating a scale in units to be used for derivation of length values;
    a segment metadata having a Boolean value that indicates whether segment timed metadata is supported;
    a segment startcode parameter having a Boolean value that indicates whether sequence metadata comprises a startcode and a sequence number; and
    a number of dimension parameter having an integer value indicating a maximum number of dimensions of the multidimensional media stream; and
  process the plurality of input media streams in parallel.

10. The non-transitory computer-readable storage medium according to claim 9, wherein the parameters associated with splitting further comprise a segment timing metadata indicating whether timing metadata is to be used for signaling segment boundaries.

11. The non-transitory computer-readable storage medium according to claim 9, further comprising instructions that cause the at least one processor to order the plurality of input media streams in an increasing order of input media segments, wherein an order is indicated using the segment timing metadata.

12. The non-transitory computer-readable storage medium according to claim 9, wherein the parameters associated with the splitting further comprising a variable-length parameter that indicates whether a length of the input media segment varies between one or more input media segments.

* * * * *